Jan. 28, 1930.  E. O. ANDERSON  1,745,202
TIRE PRESSURE GAUGE
Filed Nov. 8, 1927
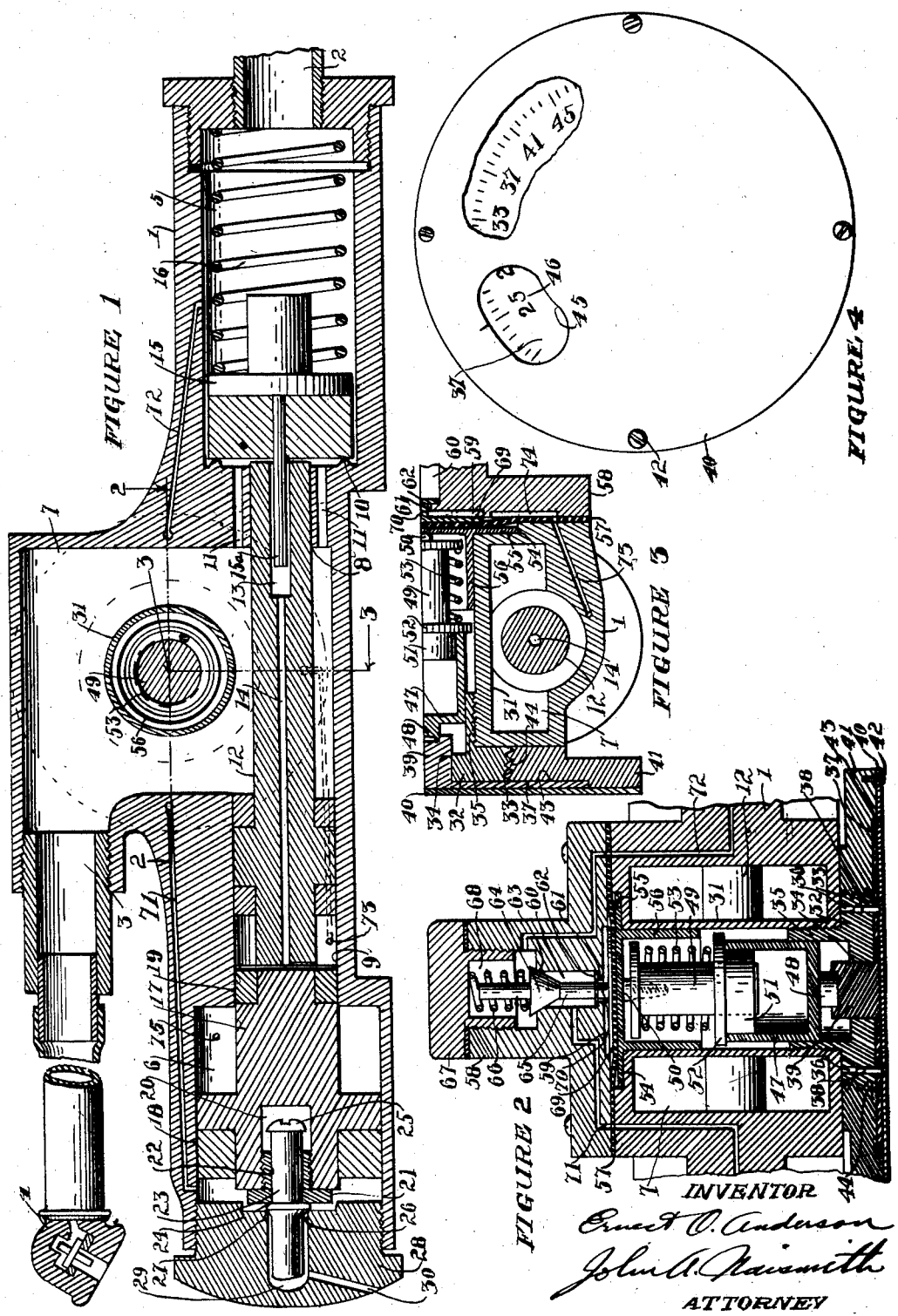
INVENTOR
Ernest O. Anderson
John A. Naismith
ATTORNEY Patented Jan. 28, 1930

1,745,202

UNITED STATES PATENT OFFICE

ERNEST O. ANDERSON, OF SAN JOSE, CALIFORNIA

TIRE-PRESSURE GAUGE

Application filed November 8, 1927. Serial No. 231,924.

It is one object of the invention to provide an automatic air pressure gauge insertible in the flexible air line used for conveying air under pressure to an inflatable tire.

It is another object of the invention to provide a gauge of the character indicated provided with a simple and efficient means for shutting off the flow of air therethrough when the air in the tire has reached a predetermined pressure.

It is also an object of the invention to provide a device of the character indicated that will permit the interrupted introduction of air to the tire with adjustable means for indicating a given pressure at which the device will cease to operate.

Finally, it is an object of the invention to provide a device of the character indicated that will be simple in form and construction, compact, durable, economical to manufacture, and highly efficient in its practical application.

In the drawing:

Figure 1 is a longitudinal section through the device, partly in elevation.

Figure 2 is a section on 2—2 of Figure 1, partly in elevation and part broken away.

Figure 3 is a section on line 3—3 of Figure 1, part broken away and partly in section.

Figure 4 is an elevation of a portion of the device showing the position of the dial.

Referring now more particularly to the drawing, I show at 1 a housing which forms the body portion of the device and which is fitted with an intake from any suitable source of supply as at 2 and a discharge at 3 through which the air is fed to a check valve 4 of the usual type as applied to the valve of the tire to be inflated. The housing 1 is provided with a chamber 5 communicating with the intake, and a chamber 6 axially aligned with the chamber 5, a larger chamber 7 being formed therein between the chambers 5 and 6. The chamber 5 is connected to the chamber 7 by a bore 8 in axial alignment with the chamber 5, and with the chamber 6 by a bore 9 in axial alignment with the bore 8. In the inner end of the chamber 5 is formed a valve seat 10, and connecting chambers 7 and 5 within the circle of the seat 10 are conduits 11.

At 12 I show a plunger extending through chamber 7 and sliding in bores 8 and 9 as shown, this plunger having a valve stem guide 13 formed in the end directed toward chamber 5 and a conduit 14 extending axially therethrough as shown.

In the chamber 5 is mounted a valve 15 provided with a stem engaging guide 13, as at 15ª, and normally seated upon the seat 10 by means of a spring 16.

At 17 I show a piston having its head mounted to reciprocate in chamber 6 as at 18, one end engaging the bore 9 as at 19 and the outer end having a recess 20 formed therein. In the recess 20 is threaded a cap 21 provided with a bore 22 in which is slidably mounted a pin 23. The pin 23 has a shoulder 24 formed thereon to engage the outer surface of the cap, and has a head 25 on its inner end and disposed within the recess, the spacing of the shoulder and head relative to the thickness of the cap 21 being such as to permit a given axial sliding movement between the pin and piston. The portion 26 of the pin forms a valve adapted to seat upon a valve seat 27 on a closure 28 threaded into the outer end of chamber 6. This closure 28 has a recess 29 formed therein to receive the outer end of pin 23 and the recess 29 communicates with the atmosphere at 30. The piston 17 and plunger 12 are so proportioned that air can pass around the ends of the plunger when the valves 15 and 26 are seated, but when the piston 17 is advanced the plunger is moved into contact with the valve 15 to raise it from its seat 10.

Arranged crosswise of the device and passing through chamber 7 but not communicating therewith, is a cylinder 31.

At 32 is shown a nut provided with a threaded periphery as at 33 and having a central orifice 34 formed therein, and an axially arranged flange formed thereon threaded to engage one end of the cylinder 31 as at 35. At diametrically opposite points, and equally distant from the axis of the nut are formed small orifices 36. A dial plate is shown at 37 fitted with pins 38 adapted to slidably engage the orifices 36, and having a central boss 39 adapted to slidably engage the orifice 34 and extend a distance therebeyond as shown. An outer plate is shown at 40 fixedly mounted on an annular member 41 as at 42, the member 41 having a recess 43 formed therein to receive the plate 37 and threaded at 44 to engage the threaded periphery 33 of nut 32. By means of this construction the nut 32 is held fixedly in position relative to the cylinder 31, and the dial plate 37 is held against rotation by the pins 38 in orifices 36. But the dial plate 37 may be advanced or retracted along its axis by the rotation of member 41 and plate 40 since they engage it upon both sides. The outer plate 40 has a window 45 formed therein through which the dial may be read, and the dial has delineated thereon an annular row of figures 46 indicating pounds of air pressure. The threaded engagement between the nut 32 and member 41 is preferably such that the member 41 may be given one complete revolution on the nut 32 thereby providing for a reading of the complete circle of figures on the dial and moving the boss 39 forwardly or backwardly a definite distance. In the present case, when the boss is retracted the dial will show the figure twenty-five, and when it is advanced by one complete revolution of the member 41 the figure one-hundred and five will show indicating that the device may be set to operate within these extreme limits of air pressure in pounds.

Slidably mounted within the flange 35 is a cup-shaped member 47 with a pin 48 on its closed end engaging the boss 39. A bolt 49 has a screw 50 set in one end and is fitted with an adjustable nut 51 on the other end adapted to enter the open end of the member 47 as shown, and has a flange 52 slidably mounted thereon to overlie and engage the edge of the member 47. A spring is inserted between the head of the bolt and the flange or ring 52. In an annular recess 54 formed in housing 1 is a plate 55 having an axially extending flange 56 formed thereon to slidably engage the adjacent end of the cylinder 31 and envelop a portion of the structure 49—53 with the screw 50 engaging the center of its inner surface. Overlying the plate 55 and extending a distance therebeyond is a diaphragm 57. Meeting with the resistance presented by forces upon the outer side of the diaphragm the forward movement of the boss 39 as described will act upon the member 47 and ring 52 to place the spring 53 under greater compression. As herein disclosed the spring would normally be under a twenty-five pound pressure, this being secured by adjusting the nut 51. Adjusting the nut 51 would of course increase or decrease the effective length of the bolt 49, but as contact must be had at all times with the plate 55 the screw 50 may be adjusted accordingly. Obviously as the member 41 is rotated a complete revolution the resistance of the spring 53 may be increased from twenty-five to one-hundred and five pounds.

Axially mounted relative to the cylinder 31 and fixed in position on housing 1 is a cap member 58 having a recess 59 concentrically formed therein in opposed relation to the diaphragm 57, and having an axially positioned passage 60 formed therein communicating with recess 59 by an orifice 61 closed by a diaphragm 62. On the outer end of the passage 60 is formed a valve seat 63 upon which is mounted a valve 64 having a stem extending inwardly to contact with diaphragm 62 as at 65, and a stem extending outwardly upon which is mounted a spring 66. The spring 66 is compressed between the valve 64 and a closure 67. That part of the passage 60 outwardly of the valve forms a chamber 68. The result of this construction is that the valve 64 is normally seated by the spring 66, but may be lifted off its seat by an outward pressure on the diaphragm 62, and this pressure may be applied by means of a plate 69 bearing against the outer surface of diaphragm 57 and carrying a pin 70 contacting with the small diaphragm 62, the plate 69 being allowed some movement in recess 59. The passage or chamber 60 communicates with chamber 6 by means of a conduit 71, its communication with chamber 6 being at a point between the piston head 18 and the closure 28. The chamber 68 communicates with the chamber 5 by means of a conduit 72 as shown. A conduit is also shown communicating with the bore 9 at a point between the plunger 12 and piston 17 as indicated at 73, the other end of the conduit communicating with the outer side of the diaphragm 57 through the medium of a groove 74 in cap 58. These conduits 71, 72, and 73 may be formed in any suitable manner in the housing 1, but provision must be made whereby they can pass through the diaphragm 57 when the device is asembled. An orifice 75 connects chamber 74 with the atmosphere.

Assume, now, that it is desired to inflate a tire to a pressure of thirty-seven pounds. The parts 41, 42 are rotated until the figure thirty-seven on the dial 37 appears in its proper position in the window 45. This operation places the diaphragm 57 under a pressure of thirty-seven pounds through the medium of parts 39, 48, 52, 53, 50 and 55.

Since the chamber 5 has open communication with a source of air supply under high pressure, the chamber 68 is also supplied with air under high pressure through the conduit 72.

When the valve 4 is applied to the tire valve the air pressure in chamber 7 drops to equalize with the air pressure in the tire, and the air pressure on the outer side of diaphragm 57 drops accordingly since it is in communication with the chamber 7 through passages 11, 13, 14, 73, and 74. This difference in pressures on opposite sides of the diaphragm 57 causes it to move outwardly and through the medium of parts 69, 70, 62 and 65 it unseats the valve 64, and permits the high pressure air to flow from chamber 68 through chamber 60 and conduit 71 to chamber 6 where it operates the piston 17, 18 inwardly and through the medium of plunger 12 unseats valve 15. This movement of the piston 17 is limited because as soon as it strikes the head 25 on pin 23 it unseats the valve 26 and permits the air operating the piston to exhaust through passage 29—30. This exhausting of the air allows the spring 16 to return the piston and valve to their first positions, and of course allows the reseating of valve 64 and the cutting off of the flow of high pressure air through conduit 71. The unseating of valve 15, however, permits the air to flow under high pressure into chamber 7 and thence to the tire, but the immediate reseating of the valve 15 through the drop in air pressure on piston 17 as described causes the air pressure in the chamber 7 to drop to that in the tire, and consequently the air pressure on the outer side of the diaphragm 57 equalizes with that in chamber 7 and the tire as heretofore described. The piston 17 operates so rapidly, of course, that the air pressure in chamber 7 and on the outer side of the diaphragm 57 is stepped up very gradually until it equals the pressure exerted upon the inner side of the diaphragm by the spring 53. When this occurs and the pressure of the spring 53 can no longer unseat the valve 64 the device will cease to operate and the operator knows that the air pressure in the tire has been raised to the desired point as indicated on the dial.

To secure the desired action of the device it is desirable to have the plunger 12 seat perfectly upon the valve 15 when the said valve 15 is raised so as to prevent passage of the high pressure fluid through conduit 14. This, in fact, operates in the manner of a valve since it alternately opens and closes conduit 14. The pressure in chamber 7 will naturally move the plunger 12 away from the valve 15 when the latter is seated.

It is to be understood, of course, that while I have herein shown and described but one specific embodiment of the invention, changes in form, construction, and method of assembly and operation may be made within the scope of the appended claims.

I claim:

1. A pressure gauge including a housing, a resistance member enclosed therein, means for applying a given pressure upon one side of the resistance member, and means for applying fluid pressure upon the other side of the said resistance member to balance the given applied pressure, said second-mentioned means comprising a chamber having a valve controlled low pressure fluid outlet and a normally closed valve controlled high pressure fluid inlet, a conduit connecting said chamber and second mentioned side of the resistance member, fluid pressure operated means for actuating the second mentioned valve, a chamber having an exhaust valve therein and communicating with said fluid pressure operated means, and means actuated by movement of the last mentioned means for opening said valve, a conduit connecting the high pressure fluid inlet with said last mentioned chamber, and a normally closed resistance member actuated valve inserted in said last mentioned conduit.

2. A device of the character described, comprising a housing, a resistance member enclosed therein, means for applying a predetermined pressure upon the inner side of said resistance member, a chamber having a valve controlled low pressure fluid outlet and a valve controlled high pressure fluid inlet, a valve controlled conduit connecting said chamber with the outer side of said resistance member, a second chamber and exhaust means therefor, a second conduit connecting the high pressure fluid inlet with said last mentioned chamber, a normally closed resistance member actuated valve inserted in said last mentioned conduit, and means actuated by fluid pressure in said second chamber operatively mounted to open said second valve.

3. A device of the character described, comprising a housing, a resistance member enclosed therein, means for applying a predetermined pressure upon one side of said resistance member, a chamber having a valve controlled low pressure fluid outlet and a normally closed valve controlled high pressure fluid inlet, a conduit connecting said chamber with the other side of said resistance member, a second chamber, a second conduit connecting said second chamber and said high pressure fluid inlet, a normally closed resistance member actuated valve inserted in said last conduit, and means actuated by fluid pressure in said second chamber operatively mounted to open said second valve.

4. A device of the character described, comprising a housing, a diaphragm enclosed therein and means for applying a predetermined pressure upon the inner side of said diaphragm, a second diaphragm mounted in the housing to form a chamber between the two diaphragms, means inserted between the diaphragms for transmitting movement of the one to the other, a chamber having a low pressure fluid outlet and a normally closed valve controlled high pressure fluid inlet, a valve controlled conduit connecting the said chambers, a third chamber, a conduit connecting said third chamber and said high pressure fluid inlet, a normally closed valve inserted in said last conduit and diaphragm actuated means for unseating the valve, and means actuated by fluid pressure in said third chamber operatively mounted to open said valve between the second chamber and high pressure fluid inlet.

5. A device of the character described, comprising a housing, a resistance member enclosed therein, means for applying a predetermined pressure upon one side of said resistance member, a chamber having a valve controlled low pressure fluid outlet and a normally closed valve controlled high pressure fluid inlet, a normally open valve controlled conduit connecting said chamber with the other side of said resistance member, a second chamber, a conduit connecting said second chamber and said high pressure fluid inlet, a normally closed resistance member actuated valve inserted in said last conduit, and means actuated by fluid pressure in said second chamber operatively mounted to open said second valve and close the valve in the first mentioned conduit.

6. A device of the character indicated, comprising a housing, a resistance member enclosed therein, means for applying a predetermined pressure upon one side of said resistance member, a chamber having a valve controlled low pressure fluid outlet and a normally closed valve controlled high pressure fluid inlet, a conduit connecting said chamber with the other side of said resistance member, a second chamber provided with an exhaust means, a conduit connecting said second chamber with the high pressure fluid inlet, a normally closed resistance member actuated valve inserted in said last conduit, and means actuated by fluid pressure in said second chamber operatively mounted to open said second valve and then said exhaust means.

7. In a device of the character described, a housing having a resistance member enclosed therein, and means for automatically pumping up a fluid pressure against one side thereof, and means for maintaining a predetermined resistance against the other side of the resistance member and including a resiliently mounted pressure element mounted in the housing to engage the resistance member, a nonrotating dial plate axially mounted relative to the resistance member and axially movable relative thereto and mounted to actuate said pressure element, and a revoluble member engaging the plate to actuate the same and mounted on the housing for axial movement relative to the resistance member.

8. In a device of the character described, a housing having a resistance member enclosed therein, and means for automatically pumping up a fluid pressure against one side thereof, and means for maintaining a predetermined resistance against the other side of the resistance member and including a resiliently mounted pressure element positioned in the housing to engage the resistance member, a supporting element mounted in the housing in axial alignment with the resistance member, a dial plate concentrically mounted on the supporting element and having a portion extending therethrough to engage said pressure element and axially movable relative to the supporting element, and a revoluble member engaging the plate to advance or retract the same and having threaded engagement with the supporting member whereby to effect said advance or retraction when rotated.

9. A device of the character described, comprising a housing, a chamber formed therein having a valve controlled low pressure fluid outlet and a valve controlled high pressure fluid inlet, a second chamber, a conduit connecting said second chamber and high pressure inlet, a normally closed valve inserted in the conduit, means for applying a predetermined pressure to said valve tending to urge it into an open position, means actuated by fluid pressure from said first chamber mounted to urge the last mentioned means in the opposite direction, and means actuated by fluid pressure in the second chamber to open the high pressure fluid inlet and render the second mentioned means inoperative.

10. A device of the character described, comprising a chamber having a low pressure valve controlled fluid outlet, a high pressure fluid inlet chamber, a valve controlled passage connecting the first chamber and the high pressure chamber, a valve controlled exhaust chamber, a valve controlled conduit connecting the said exhaust chamber and high pressure chamber, resilient means for urging the last valve into a closed position, means for applying a predetermined pressure to said last valve to urge it into an open position, means actuated by fluid pressure from the first chamber mounted to bear against said last means to urge it away from the valve to permit its closing, and means actuated by pressure in the exhaust chamber to open the valve controlled passage to the first chamber, render the second mentioned means inoperative, and open the exhaust chamber.

11. In a device of the character described, a valve chamber, a valve resiliently seated therein to divide the same into two parts, a high pressure fluid inlet communicating with one part, a low pressure outlet communicating with the other part, resiliently mounted means positioned to bear against the valve and its resilient mounting, means for applying a predetermined pressure against said last mentioned means to urge it against said valve to open the same, and means to introduce fluid under pressure against said last mentioned means to urge it away from the valve when the valve is closed.

12. In a device of the character described, a valve chamber, a valve resiliently seated therein to divide the same into two parts, an inlet communicating with one part, an outlet communicating with the other part, resiliently mounted means positioned to bear against the valve and its resilient mounting, means for applying a predetermined pressure against said last mentioned means to urge it against said valve to unseat the same, and fluid pressure actuated means mounted to bear against said last mentioned means to urge it away from the valve when the valve is closed.

13. A device of the character described, comprising a housing, a chamber formed therein having a valve controlled low pressure outlet, a high pressure inlet chamber communicating with the first chamber, a normally closed valve controlling said communication, an exhaust chamber, a conduit connecting the exhaust chamber and the high pressure chamber, a normally closed valve mounted in said last conduit, yieldable means bearing against the valve to urge it into an open position, a normally open conduit connecting the first chamber with the face of the yieldable means to urge it away from the valve, a plunger mounted to close said last conduit and open the high pressure control valve, and means actuated by pressure in the exhaust chamber to operate said plunger.

ERNEST O. ANDERSON.